Mar. 6, 1923.
E. H. SHERBONDY
INTERNAL COMBUSTION ENGINE
Filed Aug. 24, 1917
1,447,438
3 sheets-sheet 3
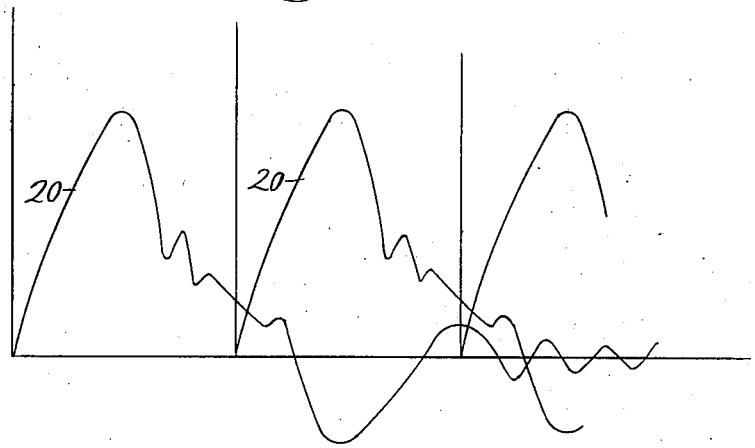
Fig. 3.
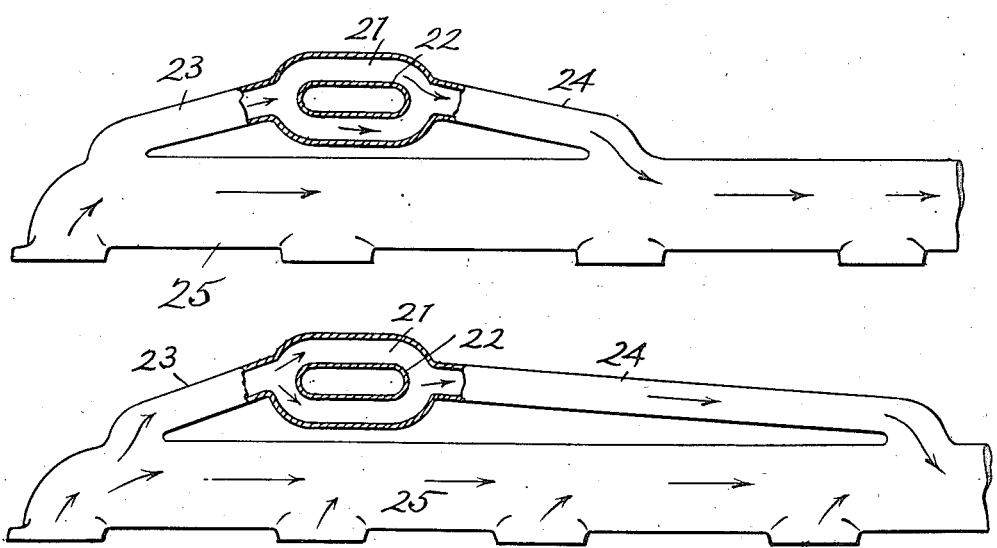
Fig. 4.
Fig. 5.
Inventor:
Earl H. Sherbondy
By Thurston & Kwis
attys.

Patented Mar. 6, 1923.

1,447,438

UNITED STATES PATENT OFFICE.

EARL H. SHERBONDY, OF CLEVELAND, OHIO, ASSIGNOR TO THE PEERLESS MOTOR CAR COMPANY, OF CLEVELAND, OHIO, A CORPORATION OF OHIO.

INTERNAL-COMBUSTION ENGINE.

Application filed August 24, 1917. Serial No. 187,926.

*To all whom it may concern:*

Be it known that I, EARL H. SHERBONDY, a citizen of the United States, residing at Cleveland, in the county of Cuyahoga and State of Ohio, have invented a certain new and useful Improvement in Internal-Combustion Engines, of which the following is a full, clear, and exact description.

This invention relates to internal combustion engines, and particularly to a device for heating the mixture by the exhaust gas passing from the cylinders.

One of the objects of the invention is to provide a heater by which the mixture passing from the carbureter to the cylinders of the engine is heated in an effective and desirable manner. A further object is to provide a heater wherein the heating action varies gradually and inversely with the speed,—in other words, wherein there is a relatively large heating effect at low speeds and a reduced heating effect at high speeds, as is desirable.

In carrying out my invention I provide a heating chamber which preferably encloses a portion of the intake manifold, and I connect this chamber to the exhaust manifold or manifolds in such a way that successive exhaust impulses are sent through the chamber. The heating chamber can be connected to the manifold or manifolds in such a manner that the exhaust impulses are all in one direction, or by connecting it to points such that the exhaust pressure at one point predominates over that at the other, and vice versa, the exhaust impulses will pass alternately in different directions through the heating chamber.

My invention may be utilized either in an engine having a single row of cylinders and a single exhaust manifold, or in an engine of the V-type having two rows of cylinders and two exhaust manifolds.

My invention may be briefly summarized as consisting in certain novel details of construction and combinations and arrangements of parts which will be described in the specification and set forth in the appended claims.

Figure 1:
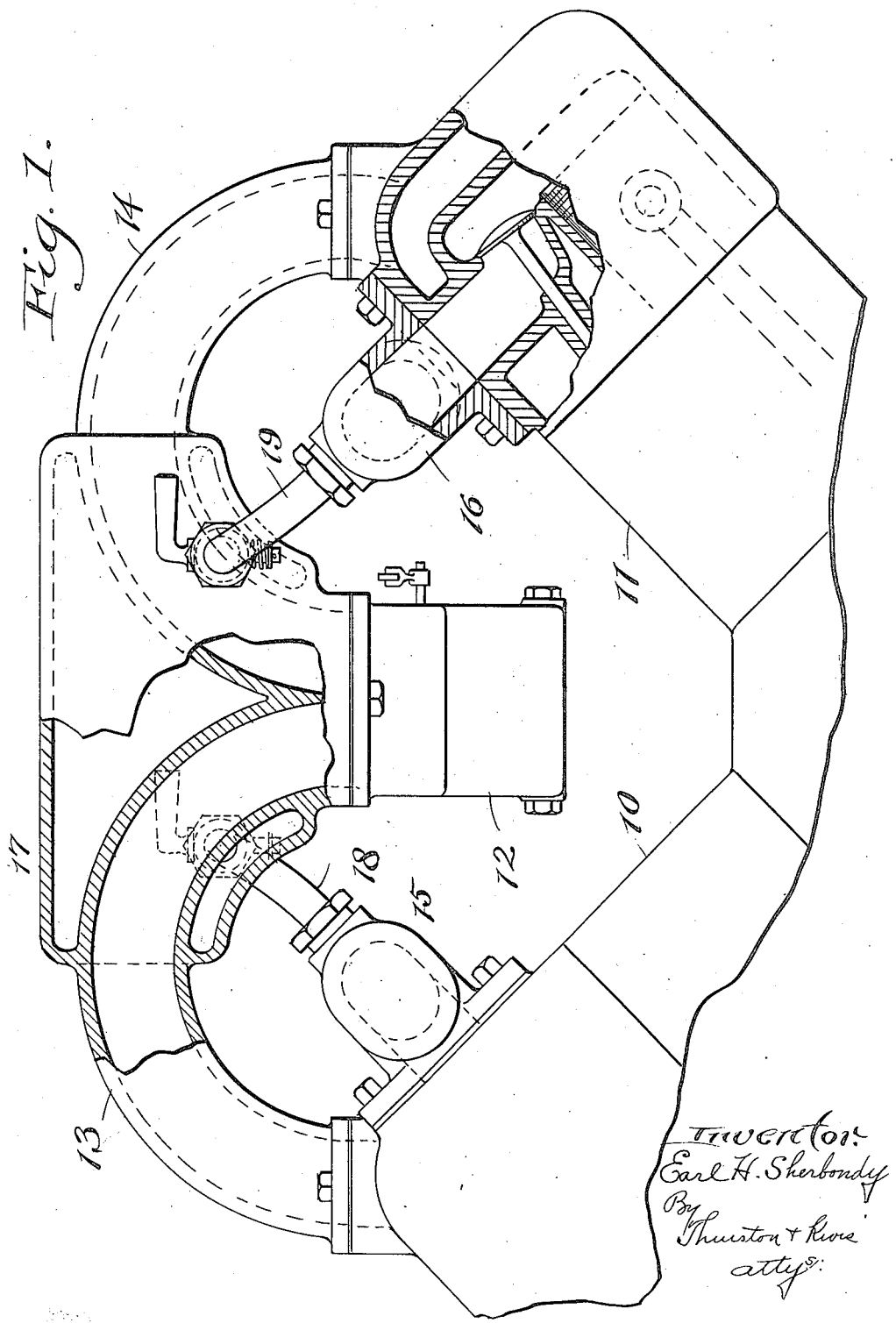
Figure 2:
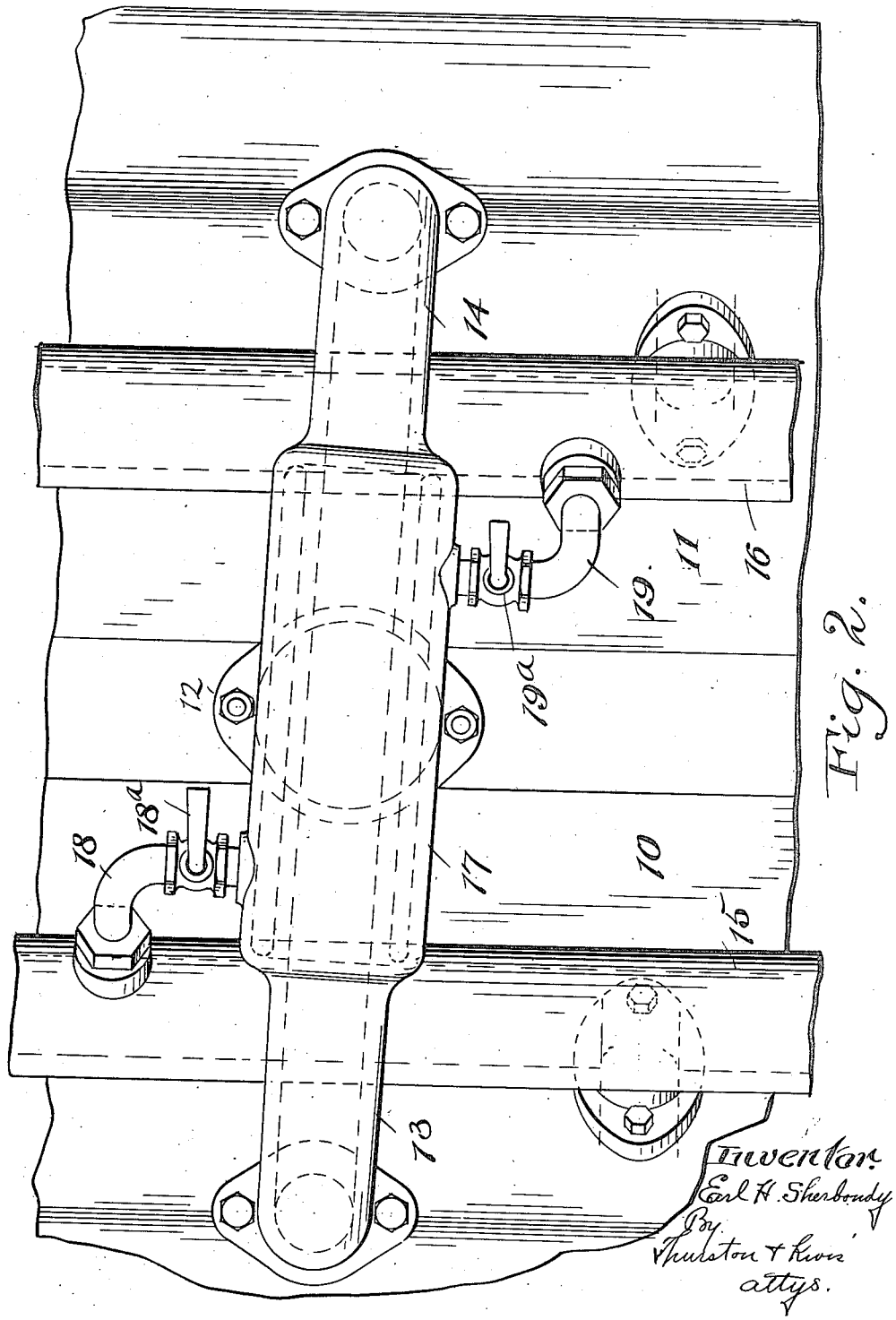

In the accompanying sheets of drawings wherein I have shown different embodiments of my invention, Fig. 1 is a view looking toward one end of an engine of the V-type, equipped with my invention, parts being in section; Fig. 2 is a fragmentary plan view of the same; Fig. 3 shows a series of superimposed exhaust pressure curves from successively exhausting cylinders; Fig. 4 is a view partly in side elevation and partly in section, showing my invention applied to a manifold of an ordinary type of engine wherein the cylinders are in alignment, the heating chamber being connected to points such that the exhaust impulses take place through the chamber alternately in opposite directions; and Fig. 5 is a similar view, but showing the heating chamber connected so that exhaust impulses take place in the same direction.

Referring first to Figs. 1 and 2, 10 and 11 represent two blocks of cylinders of the V-type engine, the cylinders or casting being of any suitable construction. In the V between the cylinders is a carbureter 12, which may be of any construction, and which has its outlet side connected by intake manifold pipes 13 and 14 to the cylinders of the two blocks or sections, one manifold passageway supplying the mixture to one set of cylinders, and the other to the second set. Additionally the engine has the usual exhaust manifolds 15 and 16, one for each set of cylinders.

Surrounding a portion of the intake manifold or the two manifold pipes is a heating chamber 17, which in this case is cast integral with the manifold members 13 and 14 and completely surrounds the same at and adjacent the point where they leave the carbureter and branch off from each other.

To supply exhaust gases to this heating chamber and to cause the volume of gases through this chamber, and hence the heating effect to vary inversely with the speed, the exhaust manifold 15 is connected by a pipe 18 to one end of the chamber, and the exhaust manifold 16 is connected by a pipe 19 to the other end thereof. Valves 18ª and 19ª control the amount of gas passing through each individual pipe.

With this construction exhaust gas is discharged from one exhaust manifold into the chamber 17, and at the same time the gas therein is driven into the opposite exhaust manifold and then the reverse takes place, the gas then being discharged from the second named manifold, driving from the heating chamber the gas into the first named, this taking place alternately from one side and then the other. At low speeds of operation there is a certain given interval of time between the exhaust on one side and then the other, and a definite amount of gas will be driven into and from the chamber, but as the speed increases, the exhaust impulses first from one side and then the other will come closer together, thus causing a less flow of gas through the heating chamber, and in consequence, less heating effect, and when the speed reaches a certain given value, the exhaust from the two sides takes place so near together that there is very little and practically no flow of the exhaust gases through the heating chamber.

It might be mentioned at this point, that if the heater 17 is connected to the two manifolds 15 and 16 adjacent the ports leading to the first cylinders of each block or section, it will be apparent that exhaust impulses from these two cylinders only will pass through the heating chamber, but if the connections of the heating chamber are made to the manifolds adjacent the exhaust ports from the second cylinders of the two blocks or sections, a portion of the gases from the first and second cylinders of each block will pass through the heating chamber.

In Fig. 3 I have shown a series of curves 20, each representing the varying pressure of the exhaust from one cylinder. These curves may represent the successive exhaust impulses into the manifold ports, whether the engine is of the V-type as herein shown, or of the ordinary type wherein the cylinders all exhaust into one manifold, such as a four or six cylinder engine. It will be observed that the exhaust impulses are of varying pressures, the pressure curve rising rapidly and then gradually decreasing, and when one is at its maximum value the other is at or about the minimum.

To attain the result above described, it is only necessary to connect the heater to two manifold points such that there is a sufficient difference in pressure at the two points, first in favor of one and then in favor of the other.

In Fig. 4 wherein I have shown my invention applied to an engine of the ordinary type having a single manifold, 21 represents the heating chamber surrounding a portion of the intake manifold 22, the heating chamber being connected by pipes 23 and 24 to points of the exhaust manifold 25 opposite the first and third ports, the manifold 25 representing the manifold of an engine wherein the cylinders are all arranged in alignment such as a four or six cylinder engine. With this arrangement, substantially the same action takes place as with the V-type engine first described, the exhaust impulses passing through the heating chamber, first in one direction and then the other.

In Fig. 5 a similar construction is shown, but while the pipe 23 connects the chamber to the manifold 25, opposite the first port as in Fig. 4, the pipe 24 connects the chamber beyond the last port, with the result that the exhaust impulses will take place in the same direction through the heating chamber, there being one impulse through the heating chamber for each cycle of engine operation.

It will be seen therefore, that my invention can be applied to engines of different types, and can be embodied in widely different forms, and I therefore aim in my claims to cover all modifications which do not involve a departure from the spirit and scope of my invention in its broadest aspects.

Having described my invention, what I claim is:

1. In an internal combustion engine, a plurality of cylinders, exhaust manifold means for receiving exhaust gases from the cylinders, means for conveying the mixture to the cylinders, a heating chamber for heating the mixture as it is conveyed to the cylinders, said chamber being separate from the exhaust manifold means and being connected to the exhaust manifold means at points such that the exhaust gas passes through the chamber from one of said points to the other first in one direction and then the other.

2. In an internal combustion engine, an intake manifold, a heating chamber extending about the same, cylinders and means for conducting exhaust gases therefrom, said heating chamber being separate from said conducting means for the exhaust gases and connected thereto at two points at which there is an interval between the exhaust impulses whereby there will be a passage of gas from one point to the other through the chamber first in one direction and then in the other.

3. In an internal combustion engine, two groups of cylinders having exhaust manifold passageways, means for conducting the explosive mixture to the cylinders, a heating chamber for the same, connections between the chamber and the two exhaust manifold passageways whereby exhaust gas will be driven alternately from one exhaust manifold passageway through the chamber to the other exhaust manifold passageway and then from the second named exhaust manifold passageway through the chamber to the first named.

4. In combination with an engine having two groups of cylinders, an exhaust manifold for each group, means for supplying a mixture to the cylinders, and a heating chamber for heating the mixture having a connection with both manifolds at points such that exhaust gases pass through the chamber frome one manifold to the other first in one direction and then the other.

5. In combination with an engine of the

V-type having two groups of cylinders, an exhaust manifold for each group, an intake manifold including manifold pipes connected to both groups, a heating chamber surrounding the intake manifold and having connections with the two exhaust manifolds, whereby exhaust gases pass first in one direction and then the other through the chamber for one manifold to the other.

6. In an internal combustion engine of the V-type, two groups of cylinders arranged in V-formation, exhaust manifolds for said groups of cylinders, a carbureter, a manifold for conducting gas from the carbureter to the two groups of cylinders, a heating chamber surrounding a portion of the manifold and located between the two groups of cylinders and between the two exhaust manifolds, and connections between the said chamber and the two exhaust manifolds respectively, whereby exhaust gases pass alternately from one manifold to the other through said chamber.

7. The combination with an internal combustion engine, of a gas induction pipe connected therewith and provided with a heating jacket having a plurality of ports through each of which gases enter and exude said engine being provided with an exhaust system different portions of which are adapted to have simultaneously periods of high and low pressure, and means for connecting each of said jacket ports with one of said portions.

8. The combination with an internal combustion engine having a plurality of exhaust elements in each of which alternately occur periods of high and low pressure, of a gas induction pipe provided with a jacket having ports arranged at its opposite ends and each connected with one of said elements, and means for regulating the communication of each of said elements with said parts.

9. In an internal combustion engine, the combination with a plurality of cylinder blocks arranged in V relation, each block being provided with an intake port and an exhaust port at its inner face, an exhaust manifold connected with the exhaust ports of each of said blocks, an induction pipe arranged between said blocks with its opposite ends connected with the intake ports of said blocks, said induction pipe being provided with a heating jacket having ports at its opposite ends each connected with one of said exhaust pipes, a carbureter connected with said induction pipe intermediate its ends, and valve means for regulating the communication of said jacket ports with said exhaust pipes.

In testimony whereof, I hereunto affix my signature.

EARL H. SHERBONDY.